United States Patent
Srour et al.

(10) Patent No.: US 8,997,171 B2
(45) Date of Patent: Mar. 31, 2015

(54) POLICY BASED APPLICATION SUSPENSION AND TERMINATION

(75) Inventors: Benjamin Salim Srour, Seattle, WA (US); Michael H. Krause, Redmond, WA (US); Haseeb Ahmed, Redmond, WA (US); Zinaida A. Pozen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 13/213,540

(22) Filed: Aug. 19, 2011

(65) Prior Publication Data

US 2013/0047198 A1 Feb. 21, 2013

(51) Int. Cl.
- *G06F 17/00* (2006.01)
- *G06F 9/50* (2006.01)
- *G06F 9/48* (2006.01)

(52) U.S. Cl.
CPC .............. *G06F 9/5022* (2013.01); *G06F 9/485* (2013.01)
USPC .................... 726/1; 718/103; 719/312; 713/1

(58) Field of Classification Search
None
See application file for complete search history.

(56) References Cited

U.S. PATENT DOCUMENTS

| | | | |
|---|---|---|---|
| 4,224,664 A | 9/1980 | Trinchieri | |
| 5,375,230 A | 12/1994 | Fujimori | |
| 5,911,065 A | 6/1999 | Williams et al. | |
| 6,148,408 A | 11/2000 | Shimoda | |
| 6,834,386 B1 | 12/2004 | Douceur et al. | |
| 6,910,210 B1 | 6/2005 | Chew | |
| 6,912,578 B1 | 6/2005 | Hanko et al. | |
| 7,143,398 B2 | 11/2006 | Chang et al. | |
| 7,316,020 B2 | 1/2008 | Raja et al. | |
| 7,584,376 B2 | 9/2009 | Finkelstein et al. | |
| 7,587,718 B1 | 9/2009 | Mincarelli et al. | |
| 7,853,812 B2 | 12/2010 | McBrearty et al. | |
| 8,275,802 B2 * | 9/2012 | Mewhinney et al. | 707/800 |
| 8,578,394 B2 | 11/2013 | Srour et al. | |
| 8,635,630 B2 | 1/2014 | Iyer | |
| 2003/0187857 A1 | 10/2003 | Ford | |

(Continued)

FOREIGN PATENT DOCUMENTS

| | | |
|---|---|---|
| CN | 101211212 | 7/2008 |
| JP | 2004362426 | 12/2004 |

OTHER PUBLICATIONS

Chang, et al., "Implementation and Optimization of DSP Suspend Resume on Dual-Core SOC", Retrieved at <<http://ieeexplore.ieee.org/stamp/stamp.jsp?tp=&arnumber=5066647>>, Proceedings of the 2009 International Conference on Embedded Software and Systems, ICESS' 09, May 25-27, 2009, pp. 185-190.

(Continued)

*Primary Examiner* — Nirav B. Patel
*Assistant Examiner* — Mohammed Waliullah
(74) *Attorney, Agent, or Firm* — John Jardine; Kate Drakos; Micky Minhas (57) ABSTRACT

In accordance with one or more aspects, an application that is to be suspended on a computing device is identified based on a policy. The policy indicates that applications that are not being used are to be suspended. The application is automatically suspended, and is allowed to remain in memory but not execute while suspended. Additionally, when memory is to be freed one or more suspended applications to terminate are automatically selected based on the policy, and these one or more selected applications are terminated.

20 Claims, 5 Drawing Sheets

(56) References Cited

U.S. PATENT DOCUMENTS

| | | | |
|---|---|---|---|
| 2005/0003850 A1 | 1/2005 | Tsuda et al. | |
| 2005/0068311 A1 | 3/2005 | Fletcher et al. | |
| 2005/0177832 A1 | 8/2005 | Chew | |
| 2006/0136882 A1 | 6/2006 | Noonan et al. | |
| 2007/0245163 A1 | 10/2007 | Lu et al. | |
| 2008/0085717 A1 | 4/2008 | Chhabra et al. | |
| 2008/0109886 A1* | 5/2008 | Matsumoto et al. | 726/5 |
| 2008/0168235 A1 | 7/2008 | Watson et al. | |
| 2008/0244616 A1 | 10/2008 | Brunswig et al. | |
| 2009/0019440 A1* | 1/2009 | Ando | 718/100 |
| 2009/0113444 A1* | 4/2009 | Hackborn et al. | 719/312 |
| 2009/0271776 A1 | 10/2009 | Schreier et al. | |
| 2009/0307696 A1 | 12/2009 | Vals et al. | |
| 2010/0011198 A1* | 1/2010 | Hooker et al. | 713/1 |
| 2010/0017506 A1 | 1/2010 | Fadell | |
| 2010/0023788 A1 | 1/2010 | Scott et al. | |
| 2010/0122167 A1 | 5/2010 | Ryu | |
| 2010/0248843 A1* | 9/2010 | Karsten | 463/43 |
| 2011/0047368 A1 | 2/2011 | Sundaramurthy et al. | |
| 2011/0154378 A1 | 6/2011 | Kishan et al. | |
| 2011/0191445 A1* | 8/2011 | Dazzi | 709/219 |
| 2012/0102504 A1 | 4/2012 | Iyer | |
| 2012/0144331 A1* | 6/2012 | Tolonen et al. | 715/769 |
| 2012/0174106 A1 | 7/2012 | Seo et al. | |
| 2013/0024818 A1 | 1/2013 | Rainisto et al. | |
| 2013/0061251 A1 | 3/2013 | Schwartz, Jr. et al. | |
| 2013/0067494 A1 | 3/2013 | Srour et al. | |
| 2014/0040917 A1 | 2/2014 | Srour | |

OTHER PUBLICATIONS

"Application Fundamentals", Retrieved from: <http://developer.android.com/guide/topics/fundamentals.html> on Sep. 24, 2010, (Sep. 23, 2010), 17 pages.

"Automatically Close Inactive Windows, Programs and Tasks with JustCloseSomeTasks", Retrieved from: <http://www.ampercent.com/automatically-close-inactive-windows-programs-tasks/1300/> on Sep. 24, 2010, 2 pages.

"Introduction", *QNX Neutrino System Analysis Toolkit Users Guide*, Available at <http://www.qnx.com/developers/docs/6.5.0/index.jsp?topic=/com.qnx.doc.instr_en_instr/introduction.html>,(May 10, 2010), 5 pages.

"JSR 278: Resource Management API for JavaTM ME", Available at <http://jcp.org/en/jsr/detail?id=278>,(Jan. 19, 2006), 7 pages.

"Microsoft Windows CE 3.0 Kernel Services: Multiprocessing and Thread Handling", Available at <http://msdn.microsoft.com/en-us/library/ms834459.aspx>,(Jun. 2000), 8 pages.

"Shutdown Inactive Application", Retrieved from: <http://www.bigresource.com/VB-Shutdown-Inactive-Application-OBBAf2TBX1.html> on Sep. 24, 2010, (Oct. 14, 2008), 9 pages.

Paranjpe, Nitin "Effective use of Task Manager", Retrieved from: <http://www.expresscomputeronline.com/20030915/techspace01.shtml> on Sep. 24, 2010, (Sep. 15, 2003), 4 pages.

"Non-Final Office Action", U.S. Appl. No. 12/911,450, (Oct. 5, 2012), 20 pages.

"PCT Search Report and Written Opinion", Application No. PCT/US2011/054514, (May 29, 2012),9 pages.

"Final Office Action", U.S. Appl. No. 12/911,450, (Mar. 1, 2013), 25 pages.

"PCT Search Report and Written Opinion", Application No. PCT/US2012/053679, (Jan. 31, 2013), 8 pages.

"Restriction Requirement", U.S. Appl. No. 13/229,574, (Mar. 29, 2013), 5 pages.

Loc-Nguyen, "Developing Power Aware Applications Using D-Bus", Retrieved from <software.intel.com/en-us/articles/developing-power-aware-applications-using-d-bus> on Mar. 1, 2013, (Apr. 22, 2009), 10 pages.

"Notice of Allowance", U.S. Appl. No. 12/911,450, (Sep. 13, 2013), 9 pages.

"Non-Final Office Action", U.S. Appl. No. 12/911,450, (May 30, 2013), 24 pages.

"Notice of Allowance", U.S. Appl. No. 13/229,574, (Jun. 24, 2013), 8 pages.

"Foreign Office Action", CN Application No. 201110327254.0, Dec. 9, 2013, 12 Pages.

"Foreign Notice of Allowance", CN Application No. 201110327254.0, Jun. 27, 2014, 3 Pages.

"Foreign Office Action", CN Application No. 201210328979.6, Nov. 3, 2014, 13 pages.

* cited by examiner

List 202

List 204

POLICY BASED APPLICATION SUSPENSION AND TERMINATION

BACKGROUND

Many computing devices can run multiple programs concurrently, some being used by the user and others running in the background or ready to be used by the user. Running multiple programs concurrently typically allows the user to quickly switch between programs that he or she desires to use. However, running multiple programs concurrently is not without its problems. One such problem is that running multiple programs concurrently can use significant amounts of resources (such as processor time, memory, etc.). This use of resources can lead to increased power consumption, and reduced battery life for battery powered computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an application that is to be suspended on a computing device is identified based on a policy. The policy indicates that applications that are not being used are to be suspended. The application is automatically suspended, and is allowed to remain in memory but not execute while suspended.

In accordance with one or more aspects, a determination is made, based on one or more metrics regarding memory usage in a computing device, that memory in the computing device is to be freed. One or more of multiple applications on the computing device to terminate to free memory of the computing device are automatically selected based on a memory-based policy, and these one or more selected applications are terminated.

BRIEF DESCRIPTION OF THE DRAWINGS

The same numbers are used throughout the drawings to reference like features.

DETAILED DESCRIPTION

Policy based application suspension and termination is discussed herein. Multiple applications can be in memory of a computing device concurrently, but only a particular number of those applications (e.g., one or two) are active at any given time. Applications that are not active are suspended. An active application is executed by one or more processors of the computing device, and a suspended application is not executed by the one or more processors. When memory is to be freed (e.g., available memory falls below a threshold value), one or more of the suspended applications are terminated. Which one or more of the suspended applications are terminated can be determined based on an amount of memory the suspended applications use and/or how recently the suspended applications were used.

Figure 1:
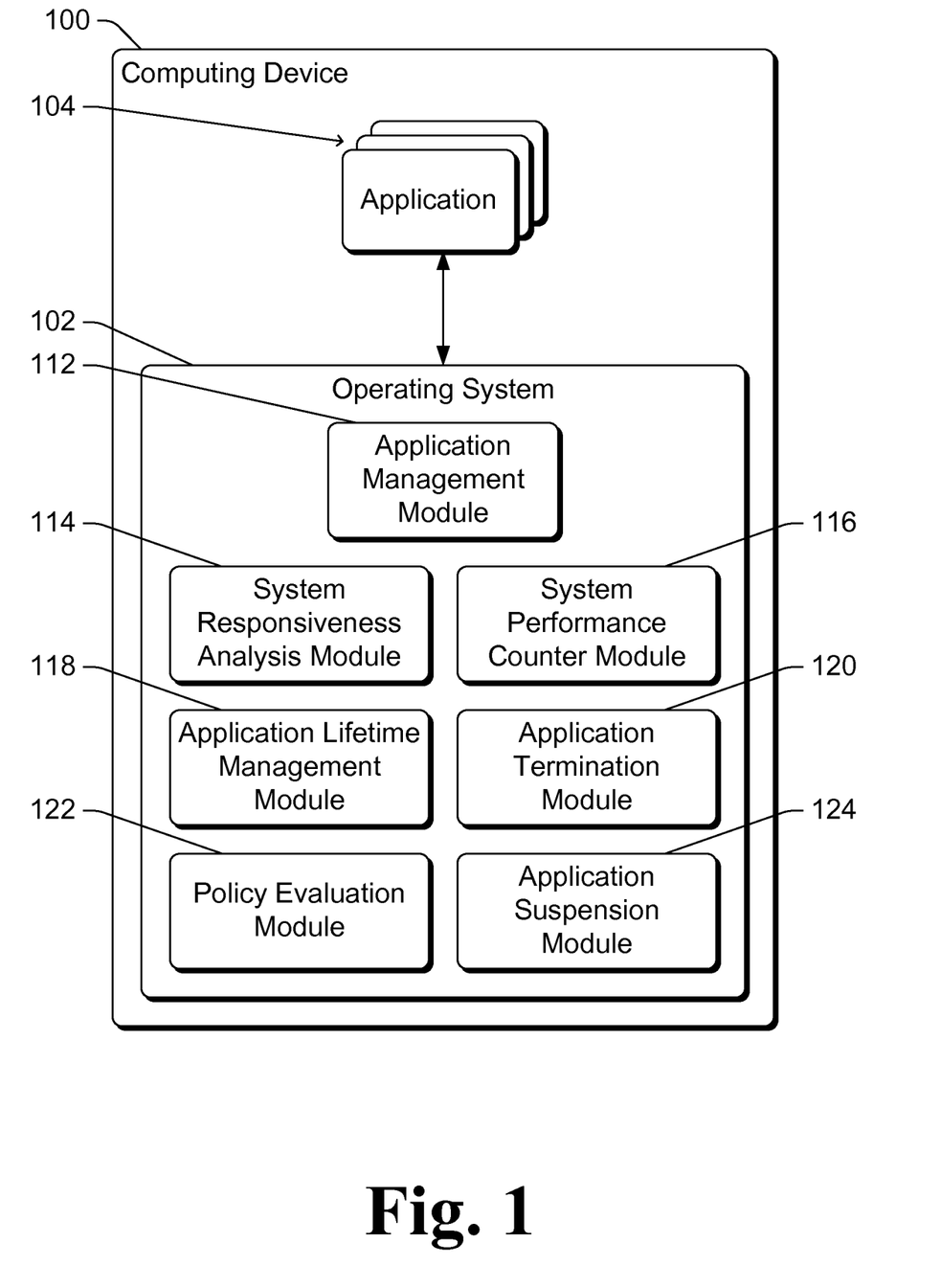
FIG. 1 is a block diagram illustrating an example computing device implementing the policy based application suspension and termination in accordance with one or more embodiments.

FIG. 1 is a block diagram illustrating an example computing device 100 implementing the policy based application suspension and termination in accordance with one or more embodiments. Computing device 100 can be a variety of different types of devices. For example, computing device 100 can be a laptop or netbook computer, a tablet or notepad computer, a desktop computer, a server computer, a mobile station, an entertainment appliance, a set-top box communicatively coupled to a display device, a television or other display device, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes an operating system 102 and one or more applications 104. During operation, operating system 102 and applications 104 run on computing device 100, with operating system 102 managing applications 104. The management of applications 104 includes automatically terminating one or more applications 104, as discussed in more detail below.

Operating system 102 includes an application management module 112, a system responsiveness analysis module 114, a system performance counter module 116, an application lifetime management module 118, an application termination module 120, a policy evaluation module 122, and an application suspension module 124. Although modules 112-124 are illustrated as being part of operating system 102, alternatively one or more of modules 112-124 can be implemented separately from operating system 102. Additionally, it should be noted that the functionality provided by one or more of modules 112-124 can be separated into multiple modules, and/or that at least some of the functionality provided by two or more of modules 112-124 can be combined into a single module.

Various modules of operating system 102 are discussed herein as notifying or communicating various indications or information to one another. It should be noted that such notification or communication can take various forms. For example, one module can invoke an application programming interface (API) of another module, one module can report an event that another module has registered to receive, one module can store data or other information in a location from which another module can retrieve the data or information, and so forth.

Application management module 112 monitors or is otherwise aware of which applications 104 are running on computing device 100 at any given time, including active and inactive applications. An active application refers to an application that is currently being scheduled for execution by one or more processors of computing device 100 and thus an application that is being allocated processor time for execution. An inactive application refers to an application that is not currently being scheduled for execution by one or more processors of computing device 100 and thus an application that is not being allocated processor time for execution. An application 104 can be loaded into memory of computing device 100 but be an inactive application, as discussed in more detail below.

Application management module 112 also monitors or is otherwise aware of which applications 104 are being used at any given time. Generally, an application 104 is being used at a particular time if a user interface for the application is being displayed or otherwise presented by computing device 100 at that particular time and/or a user of computing device 100 is providing user inputs to the application at that particular time. Module 112 can determine which applications 104 are being used at any given time in a variety of different manners. For example, module 112 can determine that an application 104 is currently being used if a window in which that application displays a user interface is currently being displayed on a display device that is part of or coupled to computing device 100, that an application 104 is currently being used if a window in which that application displays a user interface is a top or highest level window being displayed on a display device that is part of or coupled to computing device 100, that an application 104 is currently being used if a window in which that application displays a user interface is not minimized, and so forth.

In one or more embodiments, operating system 102 allows a particular number of windows (e.g., one or two) to be displayed at any given time. Applications 104 display their user interfaces within such windows, and thus only the particular number of applications 104 can display their user interfaces at any given time. At any particular time, an application 104 that is displaying a user interface on a display device that is part of or coupled to computing device 100 is determined as being an application 104 that is currently being used by a user of computing device 100 at that particular time. And, an application 104 that is not displaying a user interface on a display device that is part of or coupled to computing device 100 is determined as being an application 104 that is not currently being used by a user of computing device 100 at that particular time.

Application lifetime management module 118 controls the policy applied by operating system 102 to determine which applications 104 can execute. This policy can indicate how to determine whether an application 104 is active or inactive at any given moment, how to determine which application 104 is to be terminated as discussed in more detail below, how many windows can be displayed at any given time, and so forth. Module 118 can obtain the policy in a variety of different manners, such as being pre-configured with the policy, receiving the policy from a user of computing device 100 (e.g., via various preference or configuration settings), receiving the policy from another module of computing device 100 or from another computing device, and so forth.

Policy evaluation module 122 determines whether the policy applied by operating system 102 is being satisfied by applications 104. Policy evaluation module 122 communicates with application management module 112 to determine which applications 104 are being used at any given time. Based on this determination and the policy, module 122 determines whether the policy is being satisfied by applications 104. For example, if the policy indicates that applications that are not being used be inactive, and if one or more applications that are not being used by a user of computing device 100 are active at a particular time, then module 122 determines that the policy is not being satisfied by applications 104 at that particular time.

In response to determining that applications 104 do not satisfy the policy, policy evaluation module 122 determines one or more applications 104 to suspend so that applications 104 do satisfy the policy. Suspending an application refers to making the application inactive, as discussed in more detail below. Policy evaluation module 122 determines which one or more applications 104 to suspend based on the determination of which applications 104 are being used and the policy. For example, if the policy indicates that applications that are not being used be inactive, and if one or more applications that are not being used are active at a particular time, then module 122 determines that the applications 104 that are not being used but are active are the one or more applications 104 to suspend.

Application suspension module 124 receives from policy evaluation module 122 an indication of one or more applications 104 to suspend. In response to the indication to suspend one or more applications 104, policy suspension module 124 suspends the indicated one or more applications 104. An application is suspended by notifying the application that it is to be suspended. The application is optionally given an amount of time (e.g., 1 second or 4 seconds) to save data and/or state information that the application deems is to be saved prior to being suspended. The application stores data and/or state information to a nonvolatile or other persistent storage device, allowing the data and/or state information to be subsequently retrieved (even if the application is terminated). Suspending an application refers to changing the application from being active to being inactive. An inactive application (also referred to as a suspended application) is not executed by a processor of computing device 100 as discussed above. An application can be suspended in different manners, such as by invoking an API of operating system 102 to suspend the application.

It should be noted that once suspended, an application can subsequently become active. For example, a user input can be received from a user indicating that he or she desires to use an application. If the application is inactive, the application is made active in response to a user request to use the application, and the application is executed by one or more processors of computing device 100. Making a suspended application an active application is also referred to as reactivating or resuming the application. Once active again, the application resumes execution, restoring saved state as appropriate for the application.

In one or more embodiments, the memory of computing device 100 can be organized and managed in portions typically referred to as pages. A memory manager of operating system 102 supports memory paging, transferring pages of memory between random access memory (RAM) and a storage device (e.g., Flash memory, a hard drive, etc.). In such embodiments, an application can be resumed by transferring the contents of memory that were paged to disk back to memory. Alternatively, rather than transferring the contents of memory that were paged to disk back to memory, the application can be restarted (terminated and re-executed). Whether to transfer the contents of memory that were paged to disk back to memory or restart the application can be determined in different manners, such as restarting the application if at least a threshold amount of memory (e.g., a threshold number of pages of memory, a threshold amount of the memory allocated to the application) were transferred to disk and otherwise transferring the contents of memory that were paged to disk back to memory.

System performance counter module 116 measures various metrics regarding the usage of memory of computing device 100. To run an application 104, the application 104 is typically loaded into memory of computing device 100 and the instructions of the application 104 are executed by one or more processors of computing device 100. The memory into which an application 104 is loaded is typically RAM. The usage of this RAM by applications can be measured in different ways, referred to as metrics regarding the usage of memory of computing device 100. In one or more embodiments, these metrics regarding the usage of memory of computing device 100 include one or more of a memory load metric, an available physical memory metric, an available page file space metric, and an average lifetime on standby list metric.

The memory load metric refers to an amount of memory allocated to applications 104. Each application 104 is typically allocated a particular amount of memory into which instructions for that application can be loaded and data can be stored by that application. Memory can be allocated to an application when the application is loaded and/or during running of the application. The memory allocated to each application 104 remains allocated to that application regardless of whether the application is active or inactive. System performance counter module 116 monitors the amount of memory that is allocated to each of applications 104, and the combined amount of allocated memory is used as a metric regarding the usage of memory of computing device 100. The memory allocated to an application is also referred to as the memory used by that application. System performance counter module 116 maintains an indication of how much memory is used by each application 104 and/or the combined amount of memory used by the active and inactive applications on computing device 100.

The available physical memory metric refers to an amount of physical memory that is available at any given time. In one or more embodiments, a memory manager of operating system 102 supports transferring pages of memory between RAM and a storage device (e.g., Flash memory, a hard drive, etc.). System performance counter module 116 maintains an indication of the amount of physical memory (e.g., pages in RAM) used by each application 104 and/or the combined amount of physical memory (e.g., pages in RAM) used by the active and inactive applications on computing device 100.

The available page file space metric refers to an amount of available storage space on a storage device in which pages are stored. Typically, a memory manager of operating system 102 transferring pages from RAM to a storage device (e.g., Flash memory, a hard drive, etc.) stores those pages on the storage device in a file referred to as a page file. System performance counter module 116 maintains an indication of the amount of page file space used by each application 104 and/or the combined amount of page file space used by the active and inactive applications on computing device 100.

The average lifetime on standby list metric refers to the average lifetime of pages on a standby list maintained by a memory manager of operating system 102. The standby list identifies, for example, pages of memory that have been allocated to an application 104 but are not being used by that application. The average lifetime can be calculated over various timespans, such as over a particular number of minutes (e.g., the previous minute), the life of the application, and so forth. System performance counter module 116 maintains an indication of the average lifetime of pages on a standby list for each application 104 and/or the combined average lifetime of pages on a standby list for the active and inactive applications on computing device 100.

System responsiveness analysis module 114 uses the metrics regarding memory usage to determine whether to terminate one or more applications 104. In one or more embodiments, if one or more metrics satisfy (e.g., are less than or equal to) a threshold value, then module 114 determines that memory is to be freed by terminating one or more applications 104. The threshold value can be a fixed amount (e.g., a particular number of bytes of memory) or a relative amount (e.g., 10% of the amount of memory that is in computing device 100 or that is available for allocation to applications 104). Various different threshold values can be used. For example, a threshold value can be that the amount of available physical memory is less than 800 Megabytes (MB) or 25% of the memory in computing device 100 (whichever is less), and the available physical memory metric is satisfied if the amount of available physical memory is less than 800 MB or 25% of the memory in computing device 100. By way of another example, a threshold value can be that the average lifetime of pages on a standby list is less than 20 minutes, and the average lifetime on standby list metric is satisfied if the average lifetime of pages on the standby list is less than 20 minutes. By way of yet another example, a threshold value can be that the page file is less than 10% of its limit (e.g., its maximum size), and the available page file space metric is satisfied if the available page file space is less than 10% of its limit. In response to determining that memory is to be freed, module 114 notifies application termination module 120 to terminate one or more applications 104. A terminated application is no longer running on computing device 100, and is no longer allocated memory in computing device 100. Which metrics regarding memory usage are used by system responsiveness analysis module 114 and/or threshold values to satisfy can be indicated in the policy.

Application termination module 120 determines, in response to a notification from system responsiveness analysis module 114 to terminate one or more applications 104, one or more applications 104 to terminate. An application can be terminated in different manners, such as by invoking an API of operating system 102 to terminate the application. In one or more embodiments, module 120 selects one of applications 104 to terminate and terminates the selected application 104. After terminating the selected application 104, module 120 notifies system responsiveness analysis module 114 that an application 104 has been terminated. System responsiveness analysis module 114 then uses the metrics regarding memory usage to again determine whether memory is to be freed, and notifies module 120 to terminate an application 104 if module 114 determines that memory is still to be freed. This termination by module 120 and determination by module 114 continues until module 114 no longer determines that memory is to be freed.

Alternatively, rather than selecting one application to terminate, application termination module 120 can select multiple applications 104 to terminate. How many applications 104 to terminate can be determined in different manners, such as based on the metrics regarding memory usage (e.g., which can be obtained from system performance counter module 116) and a threshold value (e.g., the same threshold value as was used by system responsiveness analysis module 114 to determine whether memory is to be freed). For example, if the threshold value is 3.2 Gigabytes (GB) and the current memory load is 3.4 GB, then module 120 can select multiple applications 104 that combined use at least 0.2 GB so that once the selected applications 104 are terminated the memory usage no longer satisfies the threshold value.

Although example manners of selecting applications to terminate are discussed herein, application termination module 120 can select one or more applications 104 to be terminated in other manners. The particular manner used to select one or more applications to be terminated can be determined in different manners, such as being indicated in the policy.

Application termination module 120 can also determine to terminate one or more applications 104 at other times and/or in response to other events. The particular times at which, or events in response to which, one or more applications 104 are to be terminated can be identified in various manners. For example, policy evaluation module 122 can notify application termination module 120 to terminate one or more applications 104 based on a particular policy applied by operating system 102. Which applications 104, and how many applications 104, are to be terminated can vary based on the particular policy. For example, a policy can indicate that when a user switch action occurs (e.g., the current user of computing device 100 changes), all suspended applications 104 are terminated. Thus, in response to a notification from policy evaluation module 122 that the current user of computing device 100 has changed, application termination module 120 terminates all suspended applications 104.

In one or more embodiments, application management module 112 maintains one or more lists of applications. These lists can be provided to or otherwise accessed by application termination module 120 and used by module 120 in selecting one or more applications 104 to terminate.

One such list that can be maintained by application management module 112 is a most recently used (MRU) list, which indicates how recently each of applications 104 was used (e.g., how recently each application 104 was last used by a user of computing device 100). The application that is currently being used is typically the most recently used application. The MRU list can be implemented in different manners, such as an ordered list from most recently to least recently used application. Each time an application is used by a user of computing device 100, the application is moved to the top of the MRU list, and other applications on the MRU list are moved down one location in the MRU list as appropriate. Thus, the application that was most recently used is at the top of the MRU list, and the application that was least recently used is at the bottom of the MRU list. The MRU list can optionally have no more than a threshold number of applications, and when an application is added to the MRU list, an application at the bottom of the MRU list can be removed from the MRU list if the threshold number of applications has been satisfied (e.g., equaled or exceeded).

Another such list that can be maintained by application management module 112 is a frequently used list, which identifies one or more applications 104 that are frequently (or are deemed likely to be frequently) used. The frequently used list can be generated by application management module 112 (e.g., by analyzing how much time particular applications 104 are used), can be based on user input from a user of computing device 100 (e.g., specifying which applications he or she frequently uses), can be pre-configured in or otherwise obtained by module 112, and so forth. The application that is most frequently used is at the top of the frequently used list, and the application that is least frequently used is at the bottom of the frequently used list. The frequently used list can optionally have no more than a threshold number of applications, and when an application is added to the frequently used list, an application at the bottom of the frequently used list can be removed from the frequently used list if the threshold number of applications has been satisfied (e.g., equaled or exceeded).

Figure 2:
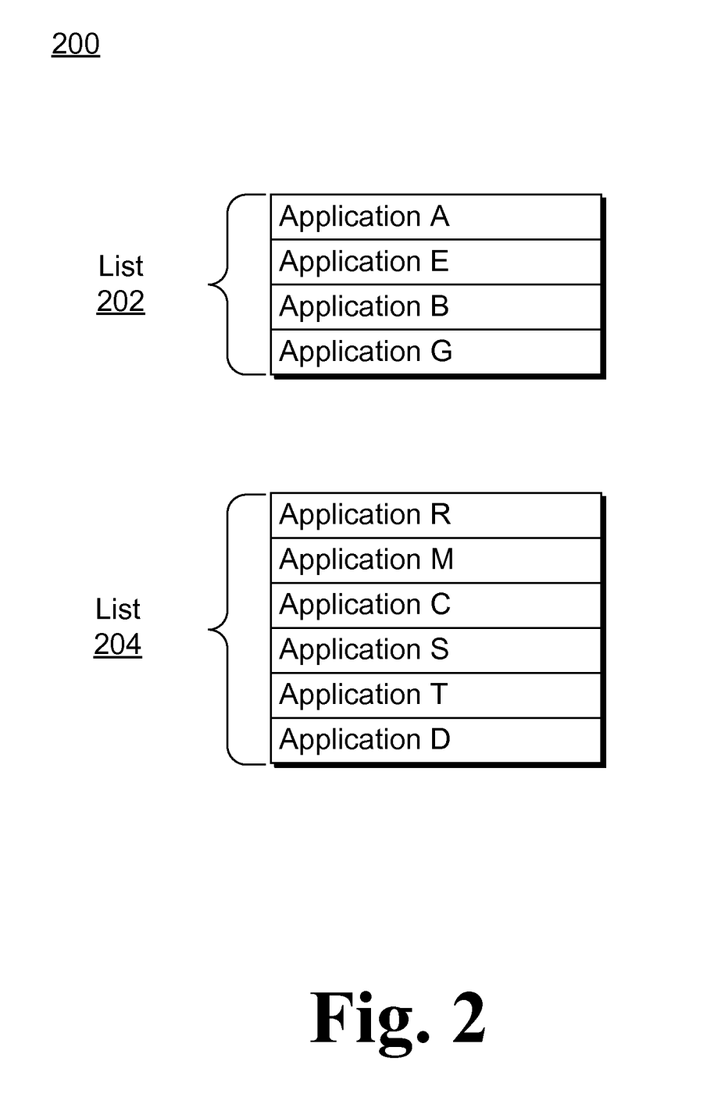
FIG. 2 illustrates example application lists in accordance with one or more embodiments.

FIG. 2 illustrates example application lists 200 in accordance with one or more embodiments. Application lists 200 include two lists 202 and 204. Each list 202 and 204 includes identifiers of different applications. An application being in a particular list refers to an identifier of that application being included in that particular list. When an application in list 202 or 204 is terminated, the application is removed from that list.

Lists 202 and 204 can be generated in different manners. In one or more embodiments, each list 202 and 204 corresponds to a different user interface window or display for user selection of applications (e.g., applications to be made active). For example, operating system 102 of FIG. 1 may display a user interface with one display that identifies (e.g., by icon, name, etc.) a set of up to four most recently used applications, and another display that identifies (e.g., by icon, name, etc.) a set of up to six recently used (but less recently used than the four most recently used) applications. The four most recently used applications identified in the one display are included in list 202, and the six recently used applications identified in the other display are included in list 204. Although application lists 200 are illustrated as including two lists, it should be noted that application lists 200 can include any number of lists.

Application termination module 120 accesses application lists 200 and uses application lists 200 to select one or more applications to terminate. Application termination module 120 can select one or more applications to terminate in different manners based on which list 202, 204 the applications are included in.

In one or more embodiments, applications in list 204 are selected based on the memory load of the applications. The memory load of an application refers to the amount of memory that has been allocated to that application (e.g., by an operating system, such as operating system 102 of FIG. 1). Application termination module 120 selects for termination the application from list 204 having the largest memory load (the application using the largest amount of memory). Module 120 continues to select for termination the application in list 204 having the largest memory load until system responsiveness analysis module 114 determines memory is no longer to be freed.

Application termination module 120 selects applications from list 204 to terminate before selecting an application from list 202. If system responsiveness analysis module 114 determines that memory is no longer to be freed after all the applications in list 204 are terminated, then no applications from list 202 need be terminated. However, if module 114 determines that memory is still to be freed after all the applications in list 204 are terminated (and thus no applications remain in list 204), then module 120 selects one or more applications from list 202 to terminate.

In one or more embodiments, applications in list 202 are selected based on how recently used the applications were. Application termination module 120 selects applications from list 202 in order from least recently used to most recently used, so that the least recently used application is the first application in list 202 to be selected and the most recently used application is the last application in list 202 to be selected. Module 120 continues selecting applications from list 202 until system responsiveness analysis module 114 determines that no more applications are to be terminated (or until all applications in list 202 are terminated).

In the discussions above, application termination module 120 is discussed as selecting applications from list 204 based on how much memory the applications use, and from list 202 based on how recently used the applications are. Alternatively, module 120 can swap which subsets these techniques apply to. That is, application termination module 120 can alternatively select applications from list 202 based on memory load, and from list 204 based on how recently used the applications are.

Thus, application termination module 120 can use different techniques (e.g., amount of memory the applications use, how recently used the applications are) to select applications from different lists of application lists 200. Alternatively, module 120 can use the same techniques for multiple list of application lists 200. For example, module 120 can select applications from list 204 based on how recently used the applications are, analogous to the selection of applications from list 202.

Alternatively, application termination module 120 can use a combination of techniques to select applications from a list of application lists 200. In one or more embodiments, module 120 selects the application in list 202 having the largest memory load, as well as each application in list 202 that is less recently used than that application having the largest memory load. For example, assume applications in list 202 are listed in order of how recently used the applications are, with Application A being most recently used and Application G being least recently used of the applications in list 202. If Application B uses the largest amount of memory, then module 120 selects both Application B (using the largest amount of memory) as well as Application G (being less recently used than the application using the largest amount of memory) as the applications to be terminated.

Alternatively, application termination module 120 can use other techniques to select applications from a list of application lists 200. For example, module 120 can select applications from one or more lists of application lists 200 in accordance with how frequently used the applications are (e.g., selecting less frequently used applications before selecting more frequently used applications).

Lists 202 and 204 are discussed above as including most recently used applications. Alternatively, one or both of lists 202 and 204 can include frequently used applications. For example, list 202 can include up to four frequently used applications, and list 204 can include up to six most recently used applications that are not already included in list 202 (e.g., if the most recently used application is included in list 202, it is not also included in list 204). Applications in list 204 are selected for termination based on the memory load of the applications or in other manners as discussed above. Applications in list 202 are selected for termination based on how recently used the applications were or in other manners as discussed above.

Figure 3:
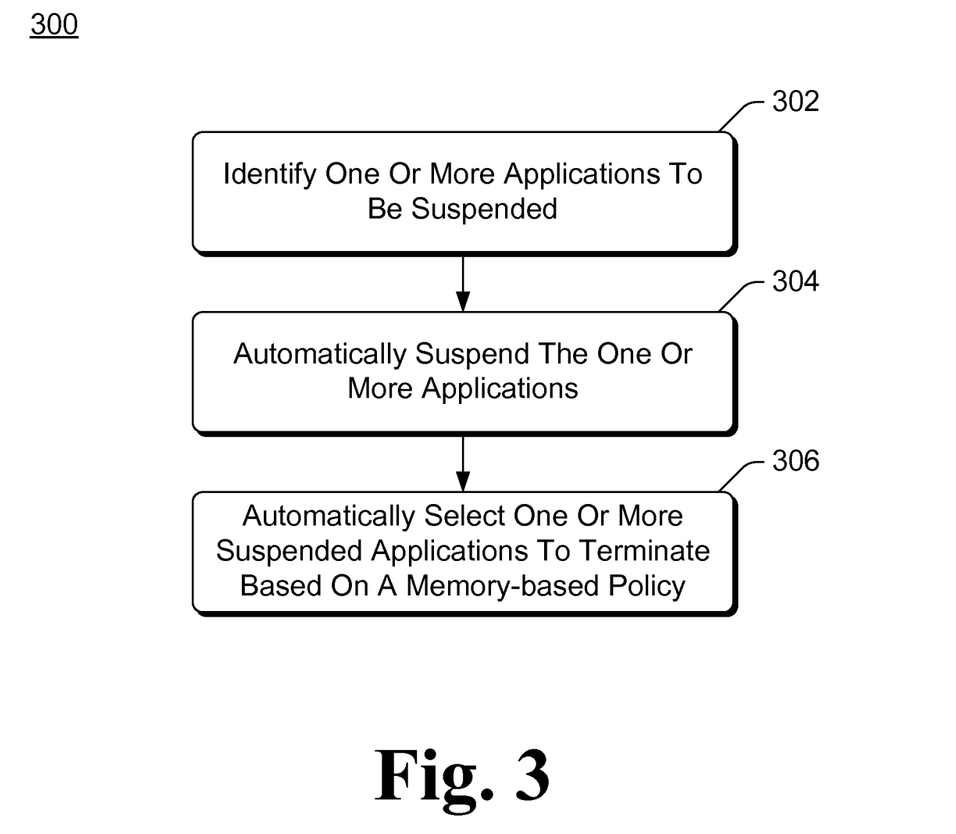
FIG. 3 is a flowchart illustrating an example process for policy based application suspension and termination in accordance with one or more embodiments.

FIG. 3 is a flowchart illustrating an example process 300 for policy based application suspension and termination in accordance with one or more embodiments. Process 300 is carried out by a computing device, such as computing device 100 of FIG. 1, and can be implemented in software, firmware, hardware, or combinations thereof. Process 300 is shown as a set of acts and is not limited to the order shown for performing the operations of the various acts. Process 300 is an example process for policy based application suspension and termination; additional discussions of policy based application suspension and termination are included herein with reference to different figures.

In process 300, one or more applications to be suspended are identified (act 302). Applications to be suspended are applications that are not currently suspended and that are not being used by a user of the computing device, as discussed above.

The one or more applications identified in act 302 are automatically suspended (act 304). The applications can be given a particular amount of time to save application state to a storage device as discussed above. The applications are suspended automatically in act 304—the applications are suspended without user input requesting that particular applications be suspended.

One or more suspended applications to terminate are automatically selected (act 306). The one or more suspended applications to terminate are selected based on a memory-based policy, including selecting applications in response to an indication that memory is to be freed as discussed above. One or more of various memory-based policies can be used, such as policies based on an amount of memory used by the suspended applications, policies based on how recently the suspended applications have been used, and so forth as discussed above.

Figure 4:
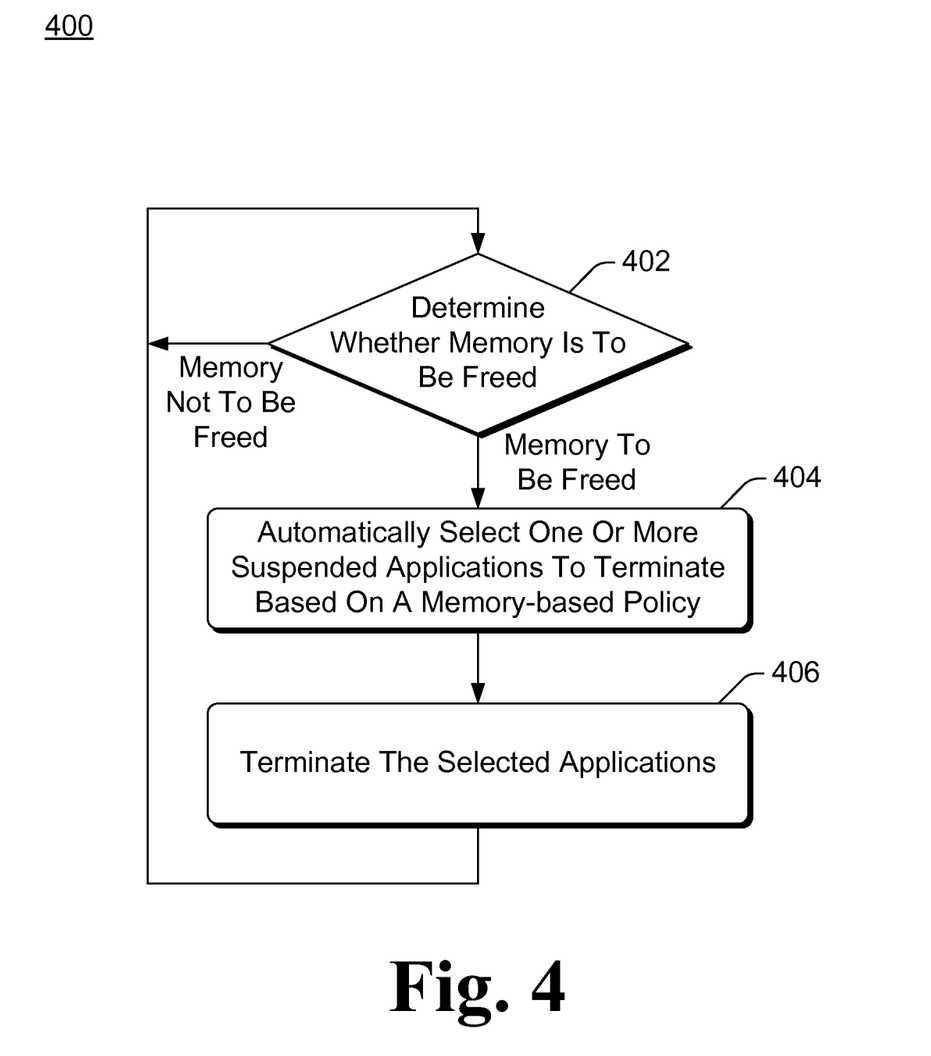
FIG. 4 is a flowchart illustrating an example process for policy based application suspension and termination in accordance with one or more embodiments.

FIG. 4 is a flowchart illustrating an example process 400 for policy based application suspension and termination in accordance with one or more embodiments. Process 400 is carried out by a computing device, such as computing device 100 of FIG. 1, and can be implemented in software, firmware, hardware, or combinations thereof. Process 400 is shown as a set of acts and is not limited to the order shown for performing the operations of the various acts. Process 400 is an example process for policy based application suspension and termination; additional discussions of policy based application suspension and termination are included herein with reference to different figures.

In process 400, a determination is made as to whether memory in the computing device is to be freed (act 402). Whether memory in the computing device is to be freed can be determined in different manners as discussed above, such as whether one or more metrics satisfy a threshold amount.

If memory is not to be freed then process 400 remains in act 402. Process 400 can repeatedly check determine whether memory is to be freed at regular or irregular intervals, in response to particular events, and so forth.

If memory is to be freed then one or more suspended applications to terminate are automatically selected (act 404). The one or more suspended applications are selected based on a memory-based policy, including selecting applications in response to an indication that memory is to be freed as discussed above. One or more of various memory-based policies can be used, such as policies based on an amount of memory used by the suspended applications, policies based on how recently the suspended applications have been used, and so forth as discussed above.

The one or more applications selected in act 404 are terminated (act 406). The applications are terminated automatically in act 406—the applications are terminated without user input requesting that particular applications be terminated. Applications terminated in act 406 can be subsequently resumed, as discussed above.

Thus, the policy based application suspension and termination techniques discussed herein support various usage scenarios. For example, applications are suspended to reduce processor usage, and terminated when it is determined that memory is to be freed. However, suspended applications are allowed to stay in memory for extended periods of time (e.g., until terminated), allowing the suspended applications to be quickly resumed and scheduled for execution by the processor if requested (e.g., a user desires to use the application).

Various actions such as communicating, receiving, providing, storing, generating, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
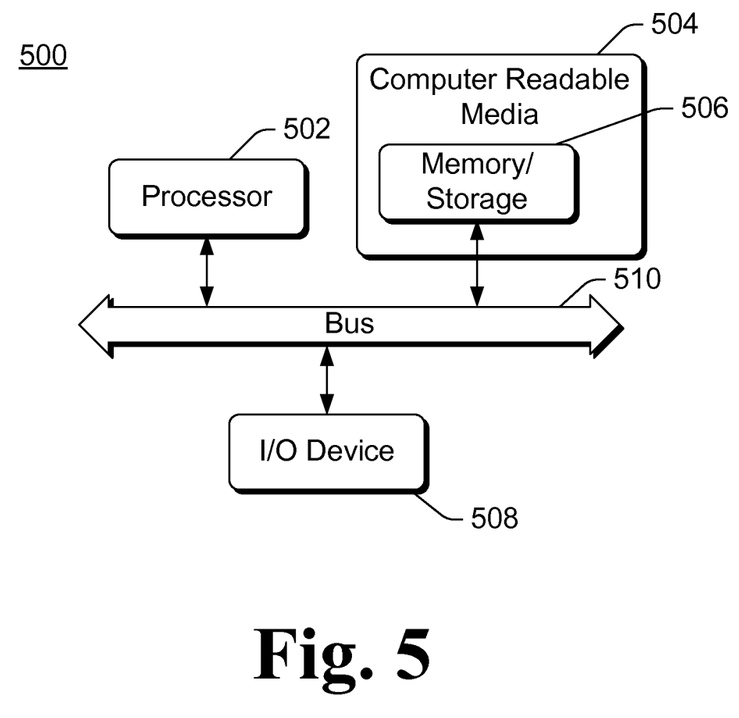
FIG. 5 illustrates an example computing device that can be configured to implement the policy based application suspension and termination in accordance with one or more embodiments.

FIG. 5 illustrates an example computing device 500 that can be configured to implement the policy based application suspension and termination in accordance with one or more embodiments. Computing device 500 can be, for example, computing device 100 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Processor 502, computer readable media 504, devices 508, and bus 510 can optionally be implemented as a single component or chip (e.g., a system on a chip). Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the policy based application suspension and termination techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
   allowing, by an operating system of a computing device, a number of windows to be displayed on a display device of the computing device;
   identifying, based on a policy and the allowable number of windows to be displayed, an application to be suspended on a computing device, the policy indicating that applications that are not being used are to be suspended;
   responsive to determining that the application is being used, enabling execution of the application by a processor of the computing device;

responsive to determining that the application is not being used and is not being displayed as one of the allowed number of windows, automatically suspending the application, the automatically suspended application being allowed to remain in memory but not execute;

determining when memory in the computing device is to be freed;

identifying multiple applications on the computing device that are suspended; and selecting one or more of the multiple applications that are suspended to terminate, the selecting including:
  accessing a first list of recently used applications of the multiple applications;
  accessing a second list of recently used applications of the multiple applications, each of the applications in the second list being less frequently used than each of the applications in the first list; and
  selecting as the one or more of the multiple applications to terminate one or more applications in the second list that are using a largest amount of memory among the applications in the second list.

2. A method as recited in claim 1, further comprising allowing no more than two applications to be used at any given time.

3. A method as recited in claim 1, further comprising allowing the application a particular amount of time, prior to suspending the application, to save a state of the application to a nonvolatile storage device.

4. A method as recited in claim 1, further comprising resuming, after suspending the application, the application in response to a user request to use the application.

5. A method as recited in claim 1, the policy comprising a memory-based policy, and the determining comprising determining, based on the policy, when memory in the computing device is to be freed.

6. A method as recited in claim 1, the memory comprising random access memory.

7. A method as recited in claim 1, the selecting further comprising selecting, if memory is to be freed and no applications remain in the second list, one or more applications in the first list.

8. A method as recited in claim 1, the selecting one or more applications in the first list comprising selecting the one or more applications in the first list in an order from least recently used application to most recently used application.

9. A method as recited in claim 1, further comprising terminating suspended applications in response to a notification that a current user of the computing device has changed.

10. One or more computer readable storage memories encoded with instructions that, responsive to execution on a computing device, cause the computing device to perform operations comprising:
  allowing, by an operating system of a computing device, a number of windows to be displayed on a display device of the computing device;
  identifying, based on a policy and the allowable number of windows to be displayed, an application to be suspended on a computing device, the policy indicating that applications that are not being used are to be suspended;
  responsive to determining that the application is being used, enabling execution of the application by a processor of the computing device;
  responsive to determining that the application is not being used and is not being displayed as one of the allowed number of windows, automatically suspending the application, the automatically suspended application being allocated in memory but not allowed to execute;
  determining when memory in the computing device is to be freed;
  identifying multiple applications on the computing device that are suspended; and
  selecting one or more of the multiple applications that are suspended to terminate, the selecting including:
    accessing a first list of recently used applications of the multiple applications;
    accessing a second list of recently used applications of the multiple applications, each of the applications in the second list being less frequently used than each of the applications in the first list; and
    selecting as the one or more of the multiple applications to terminate one or more applications in the second list that are using a largest amount of memory among the applications in the second list.

11. One or more computer readable storage memories as recited in claim 10, the memory comprising random access memory.

12. One or more computer readable storage memories as recited in claim 10, further comprising selecting the suspended application for termination based, at least in part, on a memory-based policy.

13. One or more computer readable storage memories as recited in claim 10, further comprising removing the one or more of the multiple applications that are terminated from the second list.

14. One or more computer readable storage memories as recited in claim 10, further comprising resuming, after suspending the application, the application in response to a user request to use the application.

15. A system comprising:
  one or more modules implemented at least partially in hardware, the one or more modules configured to perform operations comprising:
    allowing, by an operating system of a computing device, a number of windows to be displayed on a display device of the computing device;
    identifying, based on a policy and the allowable number of windows to be displayed, an application to be suspended on a computing device, the policy indicating that applications that are not being used are to be suspended;
    responsive to determining that the application is being used, enabling execution of the application by a processor of the computing device;
    responsive to determining that the application is not being used and is not being displayed as one of the allowed number of windows, automatically suspending the application, the automatically suspended application being allowed to remain in memory but not execute;
    determining when memory in the computing device is to be freed;
    identifying multiple applications on the computing device that are suspended; and
    selecting one or more of the multiple applications that are suspended to terminate, the selecting including:
      accessing a first list of recently used applications of the multiple applications;
      accessing a second list of recently used applications of the multiple applications, each of the applications in the second list being less frequently used than each of the applications in the first list; and
      selecting as the one or more of the multiple applications to terminate one or more applications in the second list that are using a largest amount of memory among the applications in the second list.

16. A system as recited in claim 15, the one or more modules configured to perform further operations comprising terminating the one or more of the multiple applications that are suspended.

17. A system as recited in claim 15, the policy comprising a memory-based policy.

18. A system as recited in claim 17, the memory-based policy including one or more policies based on a memory load metric, a physical memory metric, an available page file space metric, or an average lifetime metric.

19. A system as recited in claim 15, the memory in the computing device comprising random access memory.

20. A system as recited in claim 15, the number of windows to be displayed on the display device of the computing device being two or less windows.

\* \* \* \* \*